(12) United States Patent
Hassani et al.

(10) Patent No.: US 10,732,905 B2
(45) Date of Patent: *Aug. 4, 2020

(54) AUTOMATIC I/O STREAM SELECTION FOR STORAGE DEVICES

(71) Applicant: Samsung Electronics Co., Ltd., Suwon-si, Gyeonggi-do (KR)

(72) Inventors: Sina Hassani, Santa Cruz, CA (US); Anahita Shayesteh, Los Altos, CA (US); Vijay Balakrishnan, Mountain View, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,596

(22) Filed: Apr. 4, 2019

(65) Prior Publication Data
US 2019/0235794 A1 Aug. 1, 2019

Related U.S. Application Data

(63) Continuation of application No. 15/098,111, filed on Apr. 13, 2016, now Pat. No. 10,296,264.

(60) Provisional application No. 62/293,282, filed on Feb. 9, 2016.

(51) Int. Cl.
G06F 12/12 (2016.01)
G06F 3/06 (2006.01)

(52) U.S. Cl.
CPC .............. G06F 3/0679 (2013.01); G06F 3/06 (2013.01); G06F 3/0616 (2013.01); G06F 3/0643 (2013.01); G06F 3/0652 (2013.01); G06F 3/0659 (2013.01); G06F 3/0688 (2013.01)

(58) Field of Classification Search
CPC ............................. G06F 3/0679; G06F 3/0643
USPC .......................................................... 711/103
See application file for complete search history.

(56) References Cited

U.S. PATENT DOCUMENTS

| 6,484,235 | B1 | 11/2002 | Horst et al. |
| 8,874,835 | B1 | 10/2014 | Davis et al. |
| 8,943,265 | B2 | 1/2015 | Rosenband et al. |
| 9,098,400 | B2 | 8/2015 | El Maghraoui et al. |
| 2003/0028731 | A1* | 2/2003 | Spiers ..................... H04L 49/90 711/147 |

(Continued)

FOREIGN PATENT DOCUMENTS

| JP | 2006235960 A | 9/2006 |
| JP | 5 723812 B2 | 5/2015 |

(Continued)

Primary Examiner — Jae U Yu
(74) Attorney, Agent, or Firm — Innovation Counsel LLP

(57) ABSTRACT

A method of selecting among a plurality of I/O streams through which data is to be written to a multi-streaming flash storage device is presented. According to an example embodiment, the method comprises: assigning write sequences of similar length to the same I/O streams; receiving instructions for a write operation, the instructions including a starting logical block address (LBA) and a number of blocks of data to be written; determining whether the write operation is part of an existing write sequence; identifying an I/O stream associated with an existing write sequence; and providing a stream ID of the identified I/O stream to the multi-streaming flash storage device.

20 Claims, 7 Drawing Sheets

(56) References Cited

U.S. PATENT DOCUMENTS

| | | | |
|---|---|---|---|
| 2003/0093616 A1* | 5/2003 | Slavin | G11C 15/00 |
| | | | 711/108 |
| 2004/0205253 A1 | 10/2004 | Arndt et al. | |
| 2012/0072798 A1 | 3/2012 | Unesaki et al. | |
| 2012/0102297 A1 | 4/2012 | Haines et al. | |
| 2012/0110239 A1 | 5/2012 | Goss et al. | |
| 2012/0124276 A1 | 5/2012 | Ann et al. | |
| 2012/0191900 A1 | 7/2012 | Kunimatsu et al. | |
| 2012/0254524 A1 | 10/2012 | Fujimoto | |
| 2013/0159626 A1 | 6/2013 | Katz et al. | |
| 2013/0326169 A1 | 12/2013 | Shaharabany et al. | |
| 2015/0234756 A1 | 8/2015 | Tuers et al. | |
| 2016/0139838 A1 | 5/2016 | D'Sa et al. | |
| 2016/0179386 A1 | 6/2016 | Zhang et al. | |
| 2016/0283125 A1 | 9/2016 | Hashimoto et al. | |
| 2016/0313943 A1 | 10/2016 | Hashimoto et al. | |
| 2017/0109096 A1 | 4/2017 | Jean et al. | |
| 2017/0123666 A1 | 5/2017 | Sinclair et al. | |
| 2017/0308772 A1 | 10/2017 | Li et al. | |

FOREIGN PATENT DOCUMENTS

| | | | |
|---|---|---|---|
| WO | 2012020544 A1 | 2/2012 | |
| WO | 2015005634 A1 | 1/2015 | |

\* cited by examiner

AUTOMATIC I/O STREAM SELECTION FOR STORAGE DEVICES

CROSS-REFERENCE TO RELATED APPLICATIONS

This application is a continuation application of U.S. patent application Ser. No. 15/098,111 filed Apr. 13, 2016, which claims priority to and the benefit of U.S. Provisional Patent Application No. 62/293,282, titled "INLINE AUTOMATIC I/O STREAM DETECTION FOR FLASH STORAGE DEVICES" and filed on Feb. 9, 2016, the disclosures of which are incorporated herein by reference in their entirety.

RELATED FIELD

The present disclosure relates to a system and method of I/O stream selection that improves the performance and endurance of storage devices.

BACKGROUND

Solid-state drives (SSDs), particularly, NAND-based drives, are increasingly deployed within enterprise datacenters thanks to their high performance and low power consumption. Decreasing cost-per-gigabyte is also accelerating SSD adoption to replace hard disk drives (HDDs) in storage applications. One drawback of SSDs is that, as a device continually writes data, valid data may become fragmented. As such, garbage collection is used to reclaim free space, which includes copying user data to new storage blocks and erasing invalid data storage blocks, thereby allowing the media to store new write data.

However, garbage collection decreases both SSD read and write performance. In addition, garbage collection increases write amplification because individual host data write requests may result in multiple internal SSD writes to the medium. Write amplification occurs, for example, when valid data is first read from a media block about to be erased, then rewritten to another media storage block, accompanied by the write to store new host data. Consequently, write amplification decreases SSD lifetime because each flash chip generally can endure a certain number of writes before it begins to fail.

Multi-streaming is a new capability of flash drives that allows software applications to perform write operations in specified I/O streams based on data properties or groupings, such as data lifetime (amongst many others). Multi-streaming may also be implemented in multi-drive systems such that each drive is mapped to one or more streams in a way that minimizes variation of data. Thus, each I/O stream may correspond to a different storage area of a single multi-streaming SSD or one of a plurality of multi-streaming SSDs.

By storing associated or similar data in the same erase block or same drive, garbage collection may be eliminated or reduced, thereby reducing the over provisioning required in SSDs, and improving their endurance. In other words, multi-streaming allows a flash drive to place data more wisely, which results in less garbage collection, lowered write amplification, and thus increased performance of the SSDs. Currently, stream assignment happens at the application layer, which requires application code to be modified in order to support this feature.

In view of the foregoing, there exists a need for the present system and method of I/O stream selection that improves the performance and endurance of flash storage devices.

SUMMARY

The present disclosure provides a method of selecting among a plurality of I/O streams through which data is to be written to a multi-streaming flash storage device, wherein each I/O stream corresponds to a different logical division area of the multi-streaming flash storage device. According to an example embodiment, the method comprises: assigning write sequences of similar length to the same I/O streams; receiving instructions for a write operation, the instructions including a starting logical block address (LBA) and a number of blocks of data to be written; determining whether the write operation is part of an existing write sequence; identifying an I/O stream associated with an existing write sequence; and providing a stream ID of the identified I/O stream to the multi-streaming flash storage device. According to another embodiment, the method may be embodied as instructions that, when executed by a computer, cause the computer to perform the method.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

Figure 1:
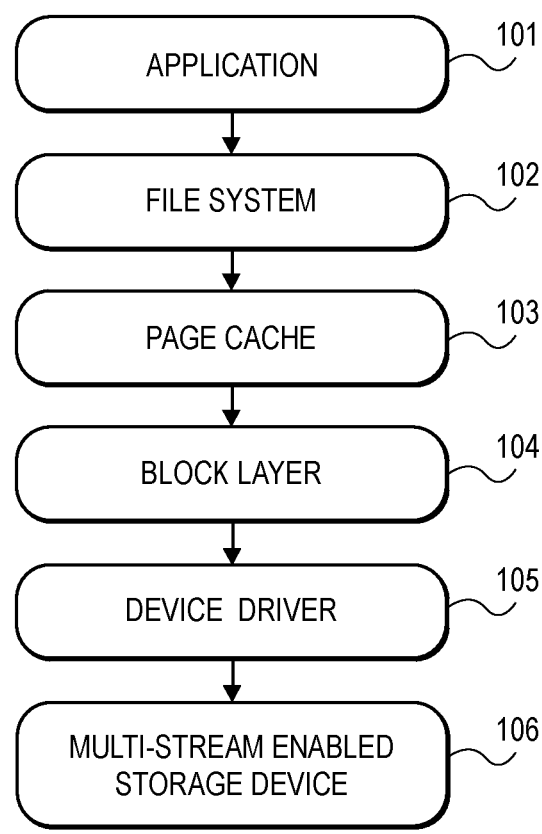
FIG. 1 illustrates an example of the levels of a software stack that includes an application, a file system, a page cache, a block I/O layer, and device drivers.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

As mentioned earlier, multi-streaming solid state drives enable software applications to write data in different I/O streams according to similarity-property or properties (such as similar lifetime) of the data, which results in write throughput increases due to the ability to match streams with SSD characteristics. In addition to performance improvement, multi-streaming reduces garbage collection, thereby resulting in a reduction of over provisioning and wear leveling. However, the below-listed factors currently limit the benefit of multi-streaming:

a) Different applications need to cooperate on the streams they are using, or the operating system (OS) has to implement a stream management policy.
b) Each application's source code needs to be modified to include the stream assignment functions, but access to application source code is not always available.
c) An application needs to know the expected lifetime (or other property) of the written data.

According to example embodiments of the present system and method, the limitations imposed by the first two factors may be overcome by implementing an automatic stream assignment model at various levels of the software stack of a computer system, rather than at the application level. FIG. 1 illustrates an example of the levels of a software stack that includes an application 101, a file system 102, a page cache 103, a block I/O layer 104, and device drivers 105, and a multi-stream enabled storage device 106. According to one embodiment of the present disclosure, the automatic stream assignment may be implemented in the block I/O layer 104 of the kernel of the operating system, which would eliminate the need for each of the individual applications or the higher-level layers of the operating system to take part in the stream assignment procedure.

At the block I/O layer 104, the kernel is aware of all write operations that are issued to the storage device, including the logical block numbers that are requested to be written. As such, trends in the logical block addresses (LBAs) may be discovered. A newly discovered trend, and thus, one of the presently disclosed inventive concepts, is that sequential write streams of a similar size generally have a similar length of lifetime.

In prior systems and methods, determining the expected lifetime of data generally requires storing the I/O history and making assumptions about write patterns. However, storing I/O history for stream detection purposes often requires a large amount of memory and a substantial overhead. Furthermore, it is often very difficult to make assumptions about random or complicated patterns of writes. As such, the performance of prior systems and methods is limited.

The present system and method overcome these limitations of prior systems and methods through the use of an automatic stream assignment model that includes a sequence detector to detect sequentiality and thereby categorize the expected lifetime of the data to be written. Because sequential writes are identifiable in simpler and less costly ways, a greater performance gain over the prior systems and methods may be achieved.

Figure 2:
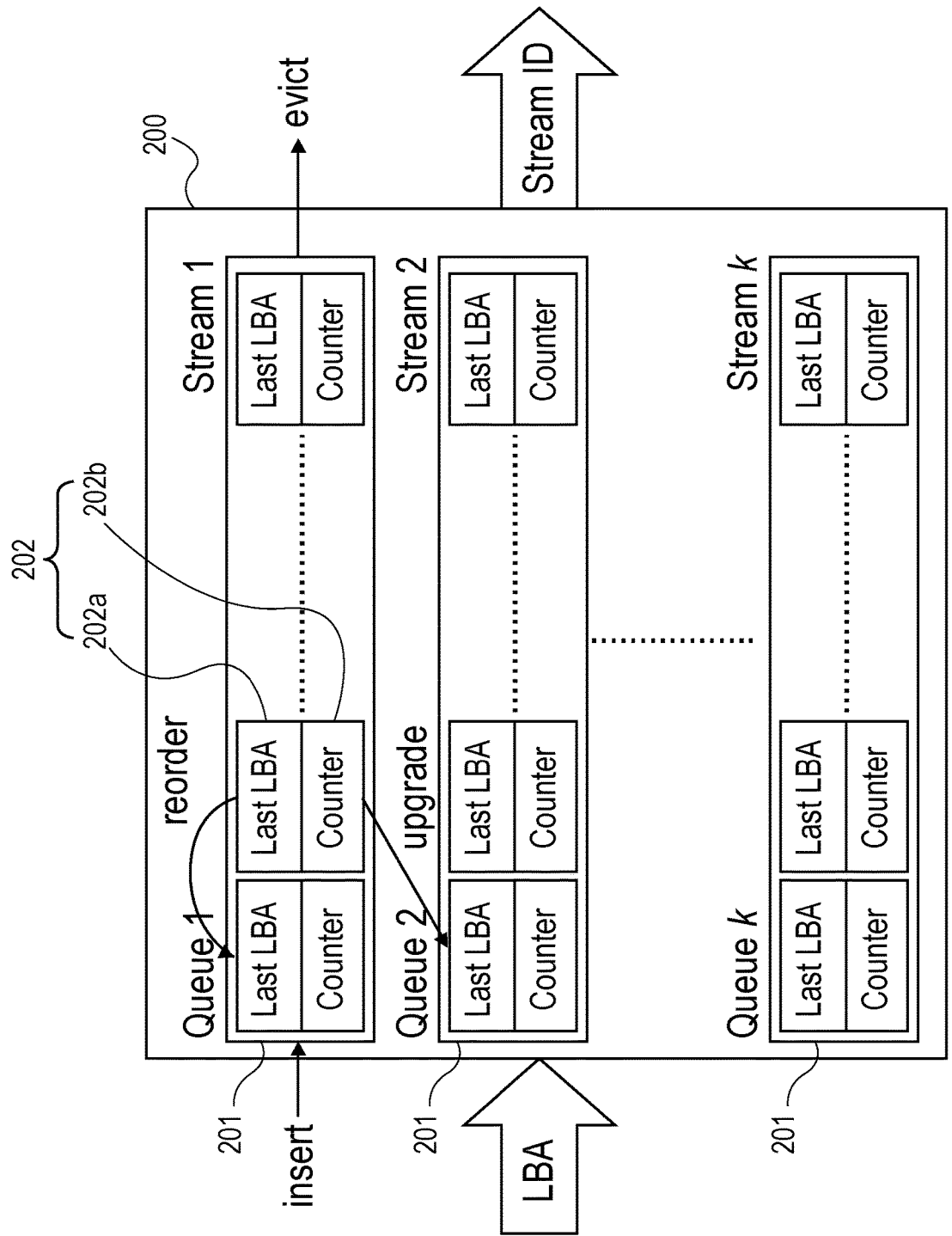
FIG. 2 illustrates a block diagram of an example sequence detector, according to an embodiment of the present disclosure.

FIG. 2 illustrates a block diagram of an example sequence detector, according to an embodiment of the present disclosure. The sequence detector 200, which requires little overhead to implement, detects sequential streams dynamically as an application is running. The sequence detector 200 includes a plurality of queues 201, the number of which may be as many as the maximum number of I/O streams allowed by the multi-streaming SSD. In the embodiment of FIG. 2, the number of queues provided equals the maximum number of I/O streams k enabled by the multi-streaming SSD being accessed, and each queue is assigned in hierarchal order (e.g., from 1 to k) to correspond to one of the I/O streams.

Each queue holds a plurality of elements 202 each representing a write sequence. Each element is configured to store a last logical block address (LBA) 202a and a count value 202b. The last LBA 202a represents the last block written in a write sequence, and the count value 202b represents a combination of the number of sequential writes and the granularity of each write request. The count value 202b is used as a measure of sequentiality.

Figure 3:
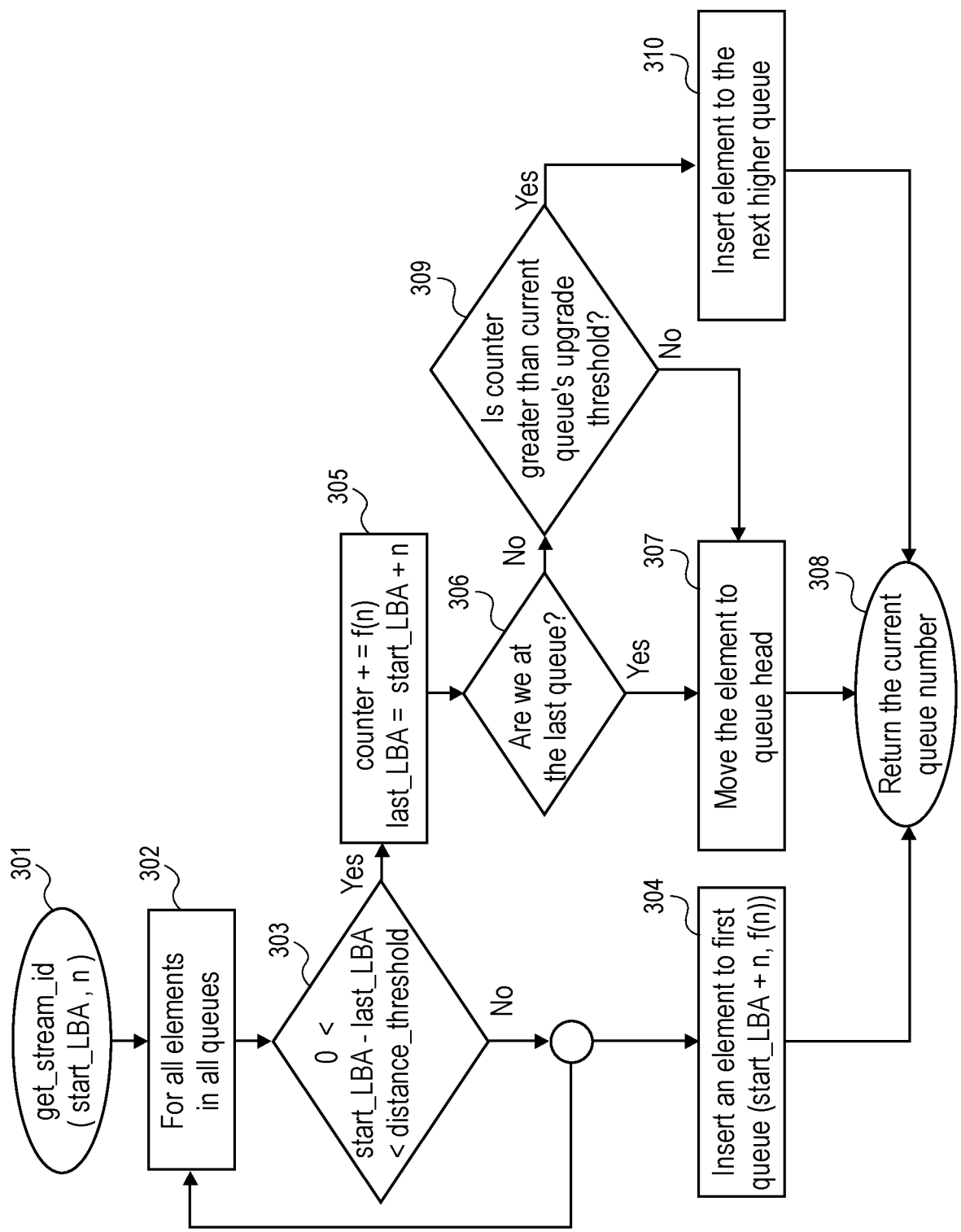
FIG. 3 illustrates a flowchart of example processes performed by a sequence detector, according to an embodiment of the present disclosure.

FIG. 3 illustrates a flowchart of example processes performed by a sequence detector, according to an embodiment of the present disclosure. Instructions for a new write operation are received by the sequence detector (301). The instructions specify a starting LBA (start_LBA) to which the write operation is to begin writing at, and a number (n) of blocks of data to be written.

Using the starting LBA, the sequence detector looks up the LBAs (or a small number within a certain distance) previously stored in the queues, for example, starting from the lowest queue in the hierarchy (302). In the case of FIG. 3, the sequence detector determines whether the starting LBA is within a threshold proximity (distance_threshold) of a last LBA (last_LBA) stored in an element of the queues by evaluating:

$$0 < \text{start\_LBA} - \text{last\_LBA} < \text{distance\_threshold}$$

(303). The evaluation may be performed for each of the elements in each of the queues until a match is found (i.e., until a last LBA satisfying the above expression is found) or until all the elements in the queues have been checked. Finding a match means that the current write operation may be a part of an existing or on-going write sequence. Finding no match means that the current write operation may be the first write operation of a new write sequence or a one-off write operation. The distance_threshold value may be predetermined or set dynamically.

If no match is found, the sequence detector inserts a new element at the front of the very first queue (e.g., lowest queue in hierarchal order) (304). The new element stores the sum of the starting LBA and the number of blocks of data to be written as the last LBA of the write operation (last_LBA=start_LBA+n), and stores the value determined by a function f(n) as the count value (e.g. counter=f(n)=2$^n$).

If a match is found, the sequence detector updates the last LBA and count value stored in the matching element (305). In the case of FIG. 3, the last LBA (last_LBA) and count value (counter) are updated as follows:

$$\text{last\_LBA} = \text{start\_LBA} + n$$

$$\text{counter} += f(n),$$

where f(n) is a function of n. That is, the last LBA is incremented by the number of blocks n written in the current operation, and the count value is incremented by a value determined by the function f(n). In other words, the count value is calculated as an accumulating function of the number of blocks of data written in the current write sequence of which the current write operation is a part of.

The sequence detector checks whether the queue containing the matching element is the highest ordered queue (306). If the queue containing the matching element (hereinafter the "current queue" for convenience) is the highest ordered queue, the sequence detector places the matching element at the head or front of the current queue (307). The sequence detector returns a queue number associated with the hierarchal order of the queue as the stream ID (308). The stream ID identifies the I/O stream to which data should be written.

If the queue containing the matching element is not the highest ordered queue, the sequence detector compares the updated count value of the matching element to an upgrade threshold value to determine whether the updated count value exceeds the upgrade threshold value (309). If the updated count value of the matching element exceeds the upgrade threshold, the matching element is upgraded from the current queue to the next higher queue (i.e., removed from the current queue and added to the head of the next queue higher in hierarchal order), and its count value is reset to zero (310). Then, the sequence detector returns a queue number associated with the hierarchal order of the higher or upgraded queue as the stream ID (308)

If the upgrade threshold is not exceeded, the sequence detector places the matching element at the head of the current queue (307), and returns a queue number associated with the hierarchal order of the current queue as the stream ID (308).

The upgrade threshold for each queue may be dynamically set by the sequence detector and may be exponentially increasing towards higher-ordered queues so that sequences stored in higher-ordered queues are updated less frequently. The length of each queue is also limited, which means that elements not used recently may be deleted. For example, the element at the end of a queue may be evicted when a new element is inserted. FIG. 2 shows how the elements of the queues may be reordered, upgraded, and evicted. Alternatively, according to another example embodiment, the evicted elements may be demoted to a lower ordered queue.

The above-described mechanism helps to ensure that the sequence detector assigns write sequences of similar length to the same I/O streams. In particular, highly sequential writes end up being stored in higher-ordered queues, while smaller sequences are grouped into lower-ordered queues, and random or complicated write patterns are not stored in queues higher than the lowest ordered queue. At the block I/O layer, this mechanism may be used to find each write operation's relative queue and hence its stream ID.

Although the automatic stream assignment model including the sequence detector is described above as being implemented in the block I/O layer, the automatic stream assignment model may be implemented in different layers of the software stack, from the block I/O layer to the application itself, depending on the structure of the operating system. Although implementing the automatic stream assignment model in the kernel has its advantages, for more application specific or complicated systems, implementation at higher levels may reduce overhead. Moreover, the automatic stream assignment model may be applied to a multi-drive system in which it may be necessary to decide what data needs to be stored on what storage device to maximize write throughput.

Figure 4:
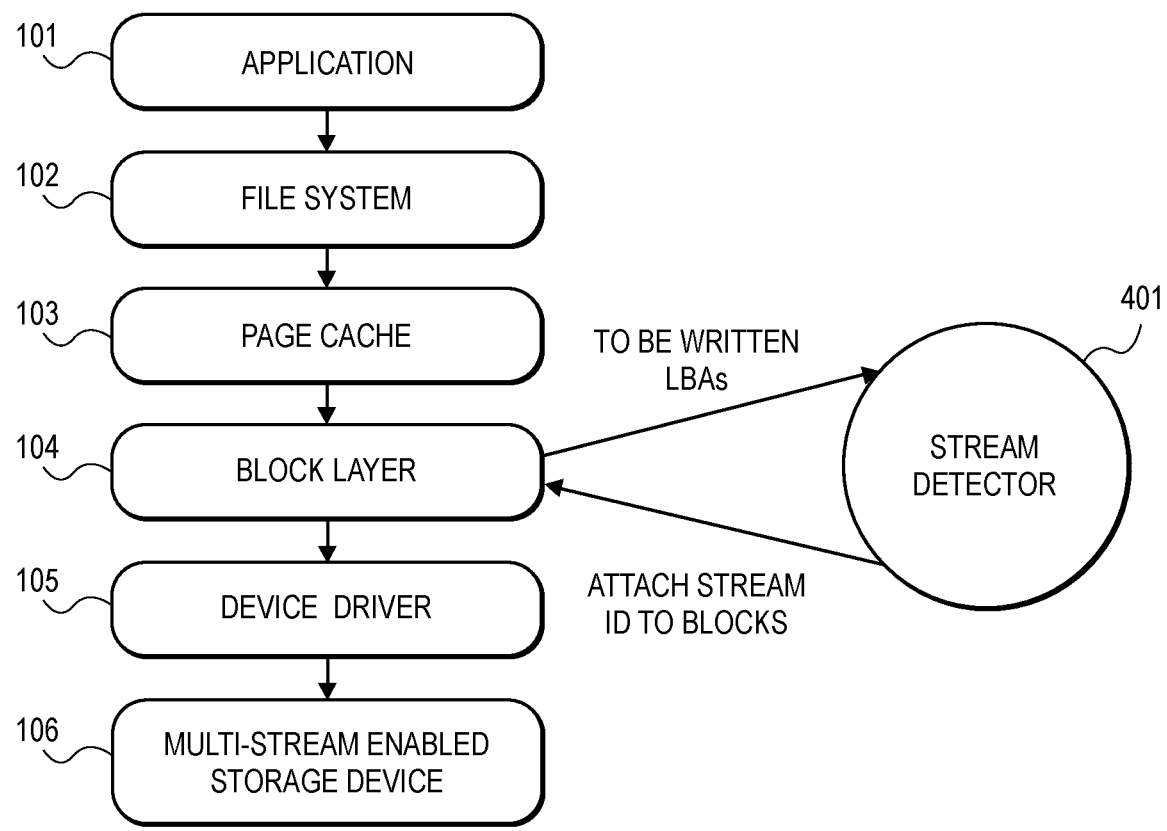
FIG. 4 shows an example implementation of an automatic stream assignment model that performs stream ID assignment per I/O call, according to an embodiment of the present disclosure.
Figure 5:
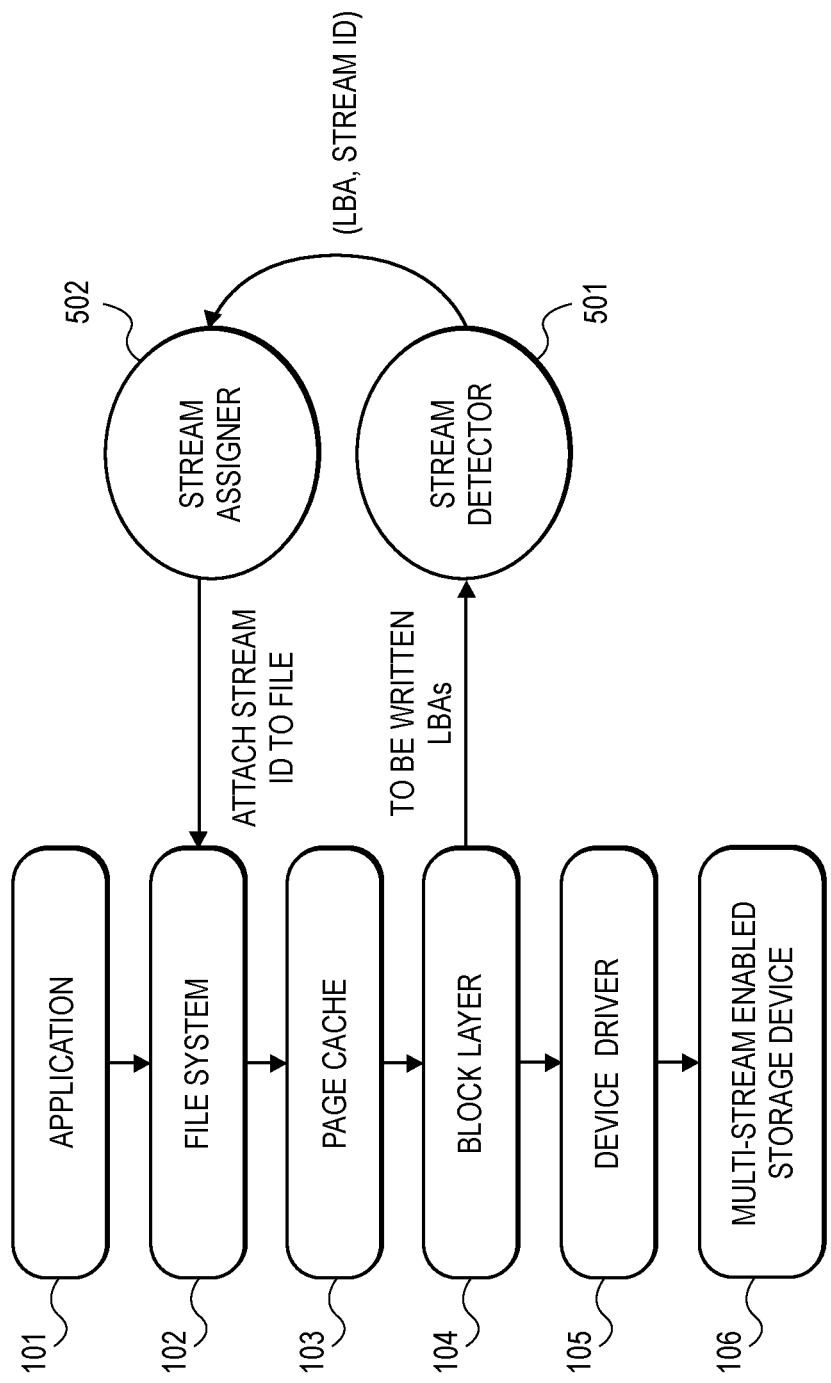
FIG. 5 shows an example implementation of an automatic stream assignment model that performs stream ID assignment per file, according to an embodiment of the present disclosure.
Figure 6:
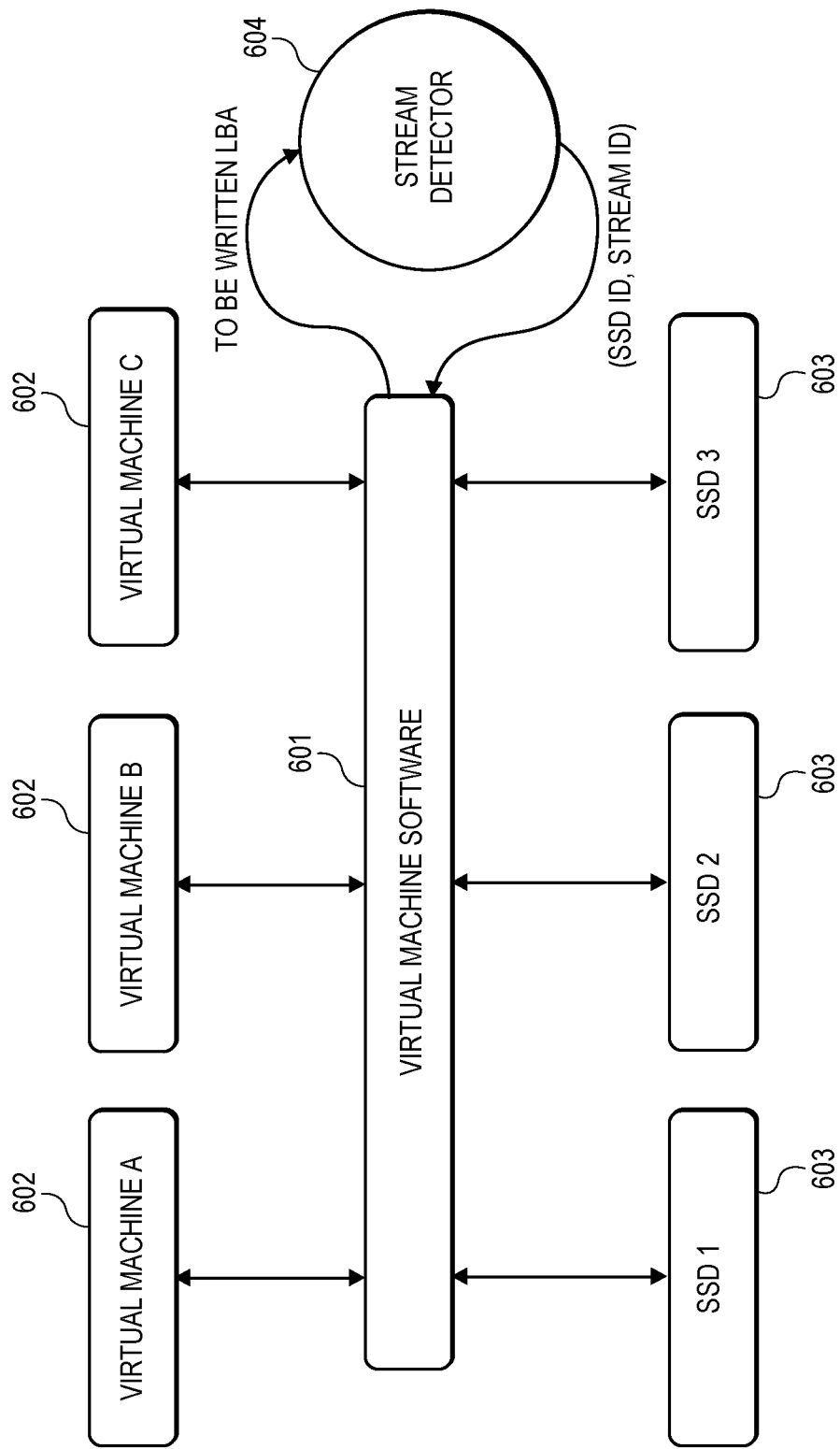
FIG. 6 shows an example implementation of an automatic stream assignment model in a large system that includes multiple SSD drives, according to an embodiment of the present disclosure.

FIGS. 4 through 6 illustrate three example implementations of an automatic stream assignment model including a sequence detector, according to various embodiments of the present system and method. In particular, the implementations of FIGS. 4 and 5 are for a single drive system that uses a multi-stream enabled SSD, and the implementation of FIG. 6 is for a virtual machine based system with multiple storage devices.

FIG. 4 shows an example implementation of an automatic stream assignment model that performs stream ID assignment per I/O access. Under this implementation, a stream or sequence detector 401 is implemented in the block I/O layer 104 of an OS kernel. The sequence detector 401 receives the logical block addresses (LBAs) to which data is to be written. The LBAs may correspond, for example, to a file write command issued by the application 101. The sequence detector 401 analyzes the LBAs, for example, using the mechanism described above with respect to FIG. 3, and returns a stream ID. The stream ID is attached to the data blocks that are to be written to the multi-stream enabled storage device 106.

Implementing the sequence detector 401 as shown in FIG. 4 allows detection of multiple streams in a single file no matter what file layout is being used. This implementation may be particularly beneficial for when the system is running virtual machines in which the host machine's file system is blind to the virtual machines' files.

FIG. 5 shows an example implementation of an automatic stream assignment model that performs stream ID assignment per file. Under this implementation, a stream or sequence detector 501 is implemented in the block I/O layer 104 (unless the file system ensures the order of write requests), and a stream assigner 502 is implemented in the file system 102. The sequence detector 501 receives the logical block addresses (LBAs) to which data is to be written. The LBAs may correspond to a file write command, for example, issued by the application 101. The sequence detector 501 analyzes the LBAs, for example, using the mechanism described above with respect to FIG. 3, and returns a stream ID to the stream assigner 502. The stream assigner 502 attaches the stream ID to a file in the file system 102. The file corresponds to the data blocks that are to be written to the multi-stream enabled storage device 106.

Although implementing the sequence detector 501 and stream assigner 502 as shown in FIG. 5 may be advantageous in reducing overhead, it would require modifications to both the block I/O layer 104 and file system 102. This implementation may have similar improvements as the current multi-streaming feature but eliminates the need to modify applications and to have global knowledge of all running applications.

FIG. 6 shows an example implementation of an automatic stream assignment model in a large system that includes multiple SSD drives. An objective of this implementation is to wisely distribute the data based on its expected lifetime amongst the drives so that the variation of lifetime within each drive is minimized, thereby resulting in a lower cost of garbage collection and lower write amplifications.

Under the implementation of FIG. 6, multiple virtual machines 602 are running on a host system 601 controlling multiple SSD drives 603, and a stream or sequence detector 604 is implemented in the virtual machine software running on the host system 601. The stream detector 604 receives the logical block addresses (LBAs) to which data is to be written to the SSD drives 603 and returns both an SSD ID and a stream ID. The SSD ID corresponds to the target SSD drive to which the data is to be written, and the stream ID corresponds to a logical division of the target SSD drive to which the data is to be written. Accordingly, stream detection and assignment are performed in the application layer in the virtual machine software where all I/O requests are known, thereby allowing the host system to map data to any drive and any stream in any drive.

Alternatively, according to another embodiment, the automatic stream assignment model described herein may be implemented at the flash translation layer (FTL) level of a multi-streaming storage device itself, that is, at the hardware level. Under such an implementation, the multi-streaming storage device interfaces with a host system as if it were a standard SSD and identifies internally the stream to which data is written based on the LBAs received from the host system. By implementing stream detection within the multi-streaming storage device itself, any kernel or file system modification to the host system is avoided, and the stream detection mechanism would be OS independent. A hardware implementation of the model would greatly reduce the overhead and may be combined with other FTL data mapping mechanisms.

In summary, the present disclosure describes a system and method of dynamically assigning I/O accesses to streams at different software stack levels by identifying long write sequences and, more particularly, assigning writes sequences of similar length to the same I/O streams of a multi-streaming storage device.

According to example embodiments, the present system and method implement the multi-streaming feature by automatically performing stream mapping at various levels of the software stack including the kernel, file system, virtual machine system, application, etc. irrespective of the running applications, virtual machines, etc. Such implementation eliminates the need to modify application code to support the multi-streaming feature. That is, I/O stream assignment may be implemented at the block I/O layer or upper levels of the operating system, depending on the expected overhead of the assignment model.

According to example embodiments, the present system and method utilize a sequence detector to identify and divide write sequences into multiple groups. More particularly, the sequence detector identifies sequential write streams and groups them together based on their observed and estimated length. The sequence detector also allows the monitoring and detection of sequential write streams that are issued to the storage device with automatic stream assignment based on the expected length of the write sequence.

Figure 7:
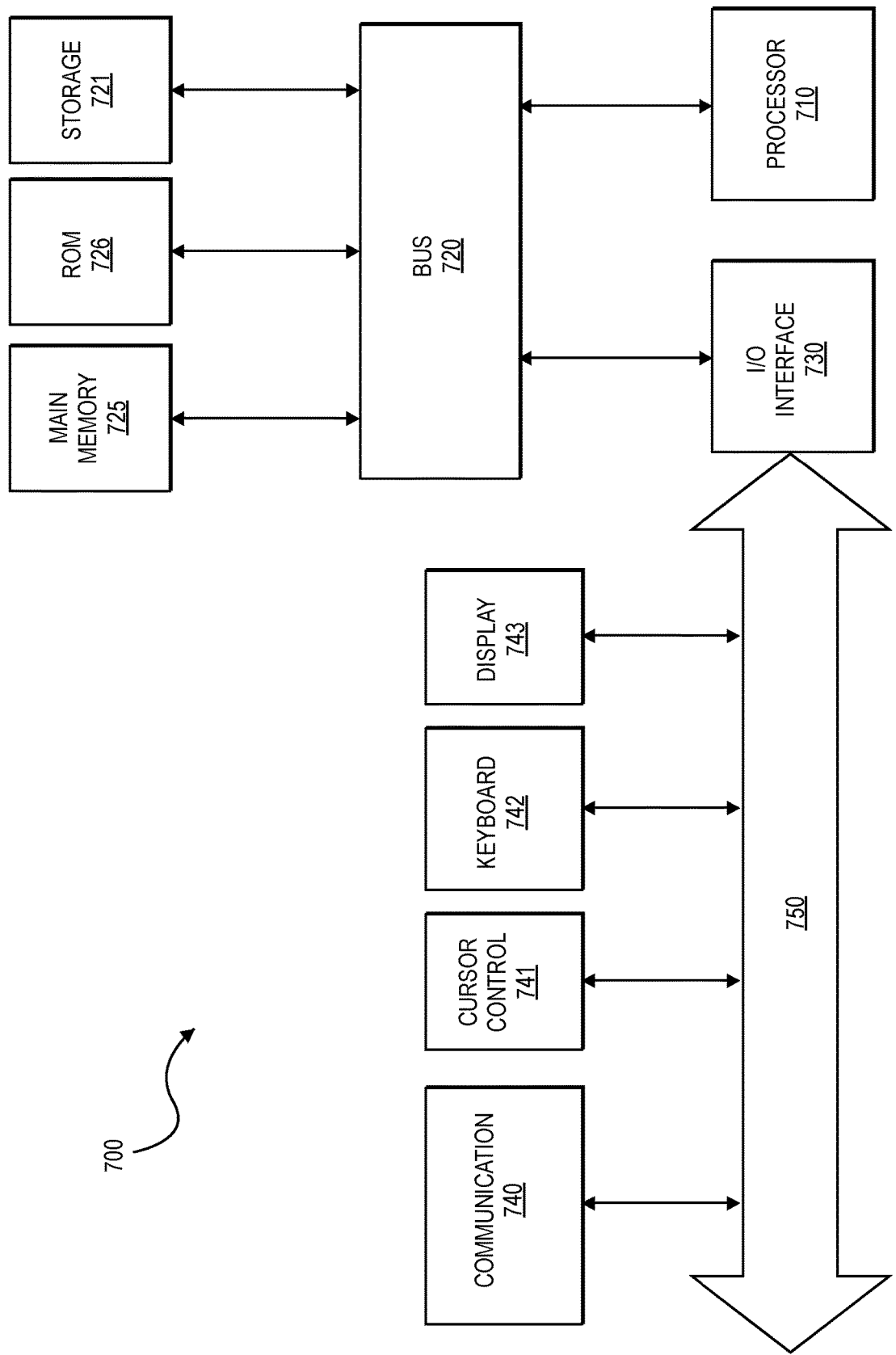
FIG. 7 illustrates an example computer architecture that may be used for implementing the present system, according to an example embodiment.

FIG. 7 illustrates an example computer architecture that may be used for implementing the present system, according to an example embodiment. The example computer architecture may be used for implementing one or more components described in the present disclosure including, but not limited to, the user terminal and/or the proxy and data exchange platform servers. One embodiment of architecture 700 comprises a system bus 720 for communicating information, and a processor 710 coupled to bus 720 for processing information. Architecture 700 further comprises a random access memory (RAM) or other dynamic storage device 725 (referred to herein as main memory), coupled to bus 720 for storing information and instructions to be executed by processor 710. Main memory 725 also may be used for storing temporary variables or other intermediate information during execution of instructions by processor 710. Architecture 700 may also include a read only memory (ROM) and/or other static storage device 726 coupled to bus 720 for storing static information and instructions used by processor 710.

A data storage device 721 such as a magnetic disk or optical disc and its corresponding drive may also be coupled to architecture 700 for storing information and instructions. Architecture 700 can also be coupled to a second I/O bus 750 via an I/O interface 730. A plurality of I/O devices may be coupled to I/O bus 750, including a display device 743, an input device (e.g., an alphanumeric input device 742, a cursor control device 741, and/or a touchscreen device).

The communication device 740 allows for access to other computers (e.g., servers or clients) via a network. The communication device 740 may comprise one or more modems, network interface cards, wireless network interfaces or other interface devices, such as those used for coupling to Ethernet, token ring, or other types of networks.

Some portions of the detailed description herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a transitory or non-transitory computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, messaging servers, or personal computers may be used with programs in accordance with the teachings herein, or it may prove convenient to construct a more specialized apparatus to perform the required method steps. The required structure for a variety of these systems appears in the description above. A variety of programming languages may be used to implement the teachings of the disclosure as described herein.

Moreover, the various features of the representative examples and the dependent claims may be combined in ways that are not specifically and explicitly enumerated in order to provide additional embodiments of the present teachings. The dimensions and the shapes of the components shown in the figures are designed to help understand how the present teachings are practiced and do limit the dimensions and the shapes shown in the examples.

What is claimed is:

1. A method of selecting among a plurality of input/output (I/O) streams through which data is to be written to a multi-streaming flash storage device, each I/O stream corresponding to a different logical division of the multi-streaming flash storage device, the method comprising:
assigning write sequences to a plurality of I/O streams according to a length of the write sequences;
receiving an instruction for a write operation from a host system, the instruction including a starting logical block address (LBA) and a number of data blocks to be written to the multi-streaming flash storage device;
determining whether the write operation is part of an existing write sequence among the write sequences;
identifying an I/O stream associated with the existing write sequence; and
providing a stream ID of the identified I/O stream to the host system.

2. The method of claim 1, wherein each of the plurality of I/O streams includes a queue, and each queue of a plurality of queues in the plurality of I/O streams includes one or more elements, and each element of the one or more elements is configured to store a last LBA of a current write sequence and a count value.

3. The method of claim 2, wherein the plurality of queues is arranged in a hierarchal order based on the length of the write sequences, and the method further comprising:
looking up LBAs stored in the one or more elements in each of the plurality of queues starting from a lowest queue in the hierarchal order; and
determining existence of a matching element among the one or more elements in a matching queue among the plurality of queues,
wherein the matching element includes a matching last LBA that is within an LBA threshold from the starting LBA included in the instruction.

4. The method of claim 3, wherein the LBA threshold is set dynamically by the host system.

5. The method of claim 3, further comprising:
if the matching element is found, updating the last LBA and a counter value of the matching element based on the starting LBA and the number of data blocks included in the instruction,
identifying a matching I/O stream corresponding to the matching queue;
assigning the write operation to the matching I/O stream; and
providing a matching stream ID of the matching I/O stream to the host system.

6. The method of claim 5, wherein a device driver of the host system writes data identified by the write operation to the multi-streaming flash storage device in the matching I/O stream based on the matching stream ID.

7. The method of claim 5, wherein the matching stream ID is provided to a block layer of the host system.

8. The method of claim 5, wherein the matching stream ID is provided to a file system layer of the host system.

9. The method of claim 5, wherein the host system is configured to control a plurality of multi-streaming flash storage devices and runs a virtual machine that is configured to detect a sequence of the write operation and assign the write operation to the matching I/O stream.

10. The method of claim 3, further comprising:
if no matching element is found, inserting a new element at a head of the lowest queue in the hierarchal order; and
updating the last LBA of the new element as a sum of the starting LBA and the number of data blocks included in the instruction, and updating a counter value of the new element using an accumulating function measuring sequentiality of data.

11. The method of claim 10, wherein the accumulating function measures the sequentiality of data.

12. The method of claim 10, further comprising:
comparing an updated count value of the new element with an upgrade threshold value;
if the updated count value of the matching element exceeds the upgrade threshold value, upgrading the matching element from the matching queue to a next higher queue among the plurality of queues in the hierarchal order;
resetting the updated count value of the new element to zero; and
providing a stream ID of the next higher queue to the host system.

13. The method of claim 12, further comprising evicting an element that is at a tail of a queue to which the new element is inserted.

14. A non-transitory, tangible computer readable storage medium having stored thereon computer executable instructions that, when executed by a computer, cause the computer to:
assign write sequences to a plurality of I/O streams according to a length of the write sequences;
receive an instruction for a write operation from a host system, the instruction including a starting logical block address (LBA) and a number of data blocks to be written to a multi-streaming flash storage device;
determine whether the write operation is part of an existing write sequence among the write sequences;
identify an I/O stream associated with the existing write sequence; and
provide a stream ID of the identified I/O stream to the host system.

15. The non-transitory, tangible computer readable storage medium of claim 14, wherein each of the plurality of I/O streams includes a queue, and each queue of a plurality of queues in the plurality of I/O streams includes one or more elements, and each element of the one or more elements is configured to store a last LBA of a current write sequence and a count value.

16. The non-transitory, tangible computer readable storage medium of claim 15, wherein the plurality of queues is arranged in a hierarchal order based on the length of the write sequences, and the non-transitory, tangible computer readable storage medium stores further computer executable instructions to cause the computer further to:
look up LBAs stored in the one or more elements in each of the plurality of queues starting from a lowest queue in the hierarchal order; and
determine existence of a matching element among the one or more elements in a matching queue among the plurality of queues, wherein the matching element includes a matching last LBA that is within an LBA threshold from the starting LBA included in the instruction.

17. The non-transitory, tangible computer readable storage medium of claim 16, wherein the plurality of queues is arranged in a hierarchal order based on the length of the write sequences, and the non-transitory, tangible computer readable storage medium stores further computer executable instructions to cause the computer further to:
   if the matching element is found, update the last LBA and a counter value of the matching element based on the starting LBA and the number of data blocks included in the instruction,
   identify a matching I/O stream corresponding to the matching queue;
   assign the write operation to the matching I/O stream; and
   provide a matching stream ID of the matching I/O stream to the host system.

18. The non-transitory, tangible computer readable storage medium of claim 17, wherein the computer executable instructions are executed by a virtual machine software running on the host system.

19. The non-transitory, tangible computer readable storage medium of claim 16, wherein the plurality of queues is arranged in a hierarchal order based on the length of the write sequences, and the non-transitory, tangible computer readable storage medium stores further computer executable instructions to cause the computer further to:
   if no matching element is found, insert a new element at a head of the lowest queue in the hierarchal order; and
   update the last LBA of the new element as a sum of the starting LBA and the number of data blocks included in the instruction, and updating a counter value of the new element using an accumulating function measuring sequentiality of data.

20. The non-transitory, tangible computer readable storage medium of claim 19, wherein the plurality of queues is arranged in a hierarchal order based on the length of the write sequences, and the non-transitory, tangible computer readable storage medium stores further computer executable instructions to cause the computer further to:
   compare an updated count value of the new element with an upgrade threshold value;
   if the updated count value of the matching element exceeds the upgrade threshold value, upgrade the matching element from the matching queue to a next higher queue among the plurality of queues in the hierarchal order;
   reset the updated count value of the new element to zero; and
   provide a stream ID of the next higher queue to the host system.

* * * * *